Dec. 15, 1925.
H. O. RUGH
1,565,963
CURRENT SUPPLY SYSTEM
Filed March 22, 1923
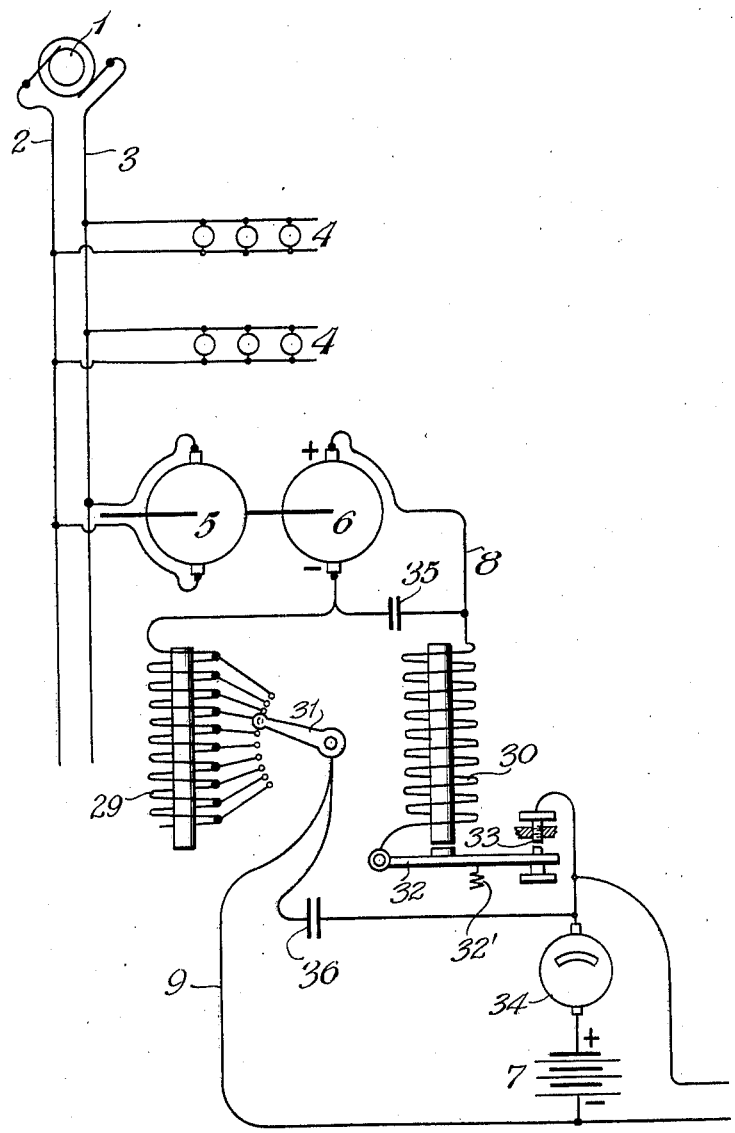
Inventor
Harry O. Rugh
By G. L. Cragg
attorney Patented Dec. 15, 1925.

1,565,963

UNITED STATES PATENT OFFICE.

HARRY O. RUGH, OF CHICAGO, ILLINOIS, ASSIGNOR OF ONE-HALF TO RICHARD CALVERT HAWS, OF CHICAGO, ILLINOIS.

CURRENT-SUPPLY SYSTEM.

Application filed March 22, 1923. Serial No. 626,771.

*To all whom it may concern:*

Be it known that I, HARRY O. RUGH, citizen of the United States, residing at Chicago, in the county of Cook and State of Illinois, have invented a certain new and useful Improvement in Current-Supply Systems, of which the following is a full, clear, concise, and exact description.

My invention relates to current supply systems.

In carrying out my invention I employ a direct current generator in charging relation to a storage battery which floats upon the generator circuit. A switch is disposed between the generator and storage battery so that the current from the storage battery will not be diverted from the load circuit but will be confined thereto in the event that the electromotive force of the generator falls to or below that of the storage battery, it being understood that like poles of the generator and storage battery are connected.

In the preferred embodiment of the invention, the switch is manually closed when the system is to be set into operation, an electro-magnet in the generator circuit serving to hold the switch closed as long as the generator pressure exceeds the battery pressure.

The amount of current supplied by the generator is gauged by a rheostat in the generator circuit and is adjusted according to the load.

The generator hum is removed from the load circuit by impedance devices, one in each side of the generator circuit. The hum is further eliminated by a condenser in shunt of the generator, a second condenser being also desirably employed in bridge of the generator circuit between the impedance devices and the battery.

The storage battery arranged as described, serves as an equalizer to absorb any excess from the generator and to replace it in the event of its failure.

The invention will be more fully explained by reference to the accompanying drawing diagrammatically illustrating one embodiment thereof employed in connection with a commercial lighting system, though the invention is not to be thus limited.

The lighting system illustrated includes a distribution circuit having a generator 1 between the sides 2 and 3 of such circuit. This circuit may supply any suitable form of load such as the lighting load 4. The generator 1 may produce either alternating or direct current. I have illustrated a motor generator whose motor element 5 is included in bridge of the circuit 2, 3 and whose generator element 6, the dynamo electric machine, is suitably coupled with the motor element. The generator 6 produces direct current. The storage battery 7 is included in bridge between the sides 8 and 9 of the circuit of the generator 6, the poles of like sign of the generator and battery being connected together.

The generator 6 and the storage battery 7 are included in bridge between the sides 10 and 11 of the load.

Impedance devices 29 and 30 are included in opposite sides of the generator circuit and between the generator and the storage battery 7, these impedance devices serving to smooth the current which flows from the generator 6 toward the storage battery 7 and circuit 10, 11. The winding of the impedance device 29 also desirably constitutes the adjustable resistance of a current regulating rheostat, the rheostat arm 31 being adjustable to include any selected portion of the winding of the impedance device 29 in circuit. The impedance device 30 desirably also constitutes an electromagnet whose armature 32 may be maintained thereby in circuit closing engagement with a contact 33 for the purpose of maintaining the circuit of the generator 6 closed.

In practice the storage battery 7 is adapted to impress six volts pressure upon the circuit 10, 11 and the generator 6 is adapted to impress a pressure of eight volts upon its circuit, the voltage impressed by the generator 6 being in excess of the voltage impressed by the storage battery 7. When the generator 6 is to be employed, the armature 32 is manually depressed against the force of the switch opening spring 32' to engage its contact with the contact 33. The circuit that is thus established through the winding at 30 is normally maintained. If the voltage of the generator 6 should be sufficiently reduced or should be eliminated the magnet 30 would become deenergized to open the generator circuit at 33, similar poles of the generator and storage battery being connected as hitherto stated.

An ammeter 34 is included in the same bridge with the storage battery 7 to measure the current flowing into the storage battery. Flow of current from the storage battery through the generator circuit is prevented when the switch 32, 33 is opened, the load circuit 10 and 11 then receiving current from the storage battery instead of from the generator 6. This is not the normal operation of the apparatus however, the generator 6 being preferably in constant service when the system is set into operation by the manual depression of the armature switch 32.

The circuit 10, 11 normally receives its supply of current from the generator 6, the battery 7 floating upon the load circuit so as to absorb excess current from the generator 6 and to supply current to the load circuit 10 and 11 in the event that the generator becomes disconnected.

I desirably also employ a condenser 35 having a capacity of say two microfarads in shunt of the commutator and brushes of the generator 6 further to prevent the hum of the generator from being impressed upon the load circuit 10, 11. Another condenser 36, of similar capacity, is desirably included in bridge of the circuit of the generator 6 between the storage battery 7 and the impedance devices 29 and 30 for the purpose of absorbing any of the hum which may have passed through said impedance devices.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a current supply system, the combination with a direct current generator; of a storage battery, similar poles of said battery and generator being connected; a circuit including said generator; a switch between the storage battery and the generator; an electro-magnet receiving current from said generator and related to said switch to hold it closed, said switch opening when said magnet releases it; and two condensers in shunt of said generator and in parallel with each other, said electro-magnet being included between said condensers.

2. In a current supply system, the combination with a direct current generator; of a storage battery, similar poles of said battery and generator being connected; a circuit including said generator; an impedance device in each side of the generator circuit; and a rheostat having the winding of one of said impedance devices for its adjustable resistance.

In witness whereof, I hereunto subscribe my name this 27th day of February A. D., 1923.

HARRY O. RUGH.